(12) United States Patent
Sogen

(10) Patent No.: US 10,384,684 B2
(45) Date of Patent: Aug. 20, 2019

(54) INFORMATION PROCESSING APPARATUS

(71) Applicant: Toyota Jidosha Kabushiki Kaisha, Toyota-shi, Aichi-ken (JP)

(72) Inventor: Kiyohiro Sogen, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 15/675,207

(22) Filed: Aug. 11, 2017

(65) Prior Publication Data

US 2018/0056991 A1    Mar. 1, 2018

(30) Foreign Application Priority Data

Aug. 26, 2016    (JP) ................. 2016-166058

(51) Int. Cl.
| | |
|---|---|
| *B60W 30/182* | (2012.01) |
| *B60W 50/08* | (2012.01) |
| *B60W 50/12* | (2012.01) |
| *B60W 40/04* | (2006.01) |
| *B60W 40/072* | (2012.01) |

(Continued)

(52) U.S. Cl.
CPC .......... *B60W 30/182* (2013.01); *B60W 40/02* (2013.01); *B60W 40/04* (2013.01); *B60W 40/06* (2013.01); *B60W 40/072* (2013.01); *B60W 40/105* (2013.01); *B60W 50/085* (2013.01); *B60W 50/12* (2013.01); *G05D 1/0088* (2013.01); *G05D 1/0214* (2013.01);
(Continued)

(58) Field of Classification Search
CPC .... B60W 30/182; B60W 40/06; B60W 40/02; B60W 40/04; B60W 40/105; B60W 40/072; B60W 50/12; B60W 50/085; B60W 2550/408; G05D 1/0276; G05D 1/0088; G05D 1/0214
See application file for complete search history.

(56) References Cited

U.S. PATENT DOCUMENTS

| | | | |
|---|---|---|---|
| 8,509,982 B2 * | 8/2013 | Montemerlo et al. | ...................... B60W 30/186 701/26 |
| 2017/0225567 A1 * | 8/2017 | Tsuda | ................... G05D 1/0212 |
| 2018/0113474 A1 * | 4/2018 | Koda et al. | .......... G05D 1/0088 |

FOREIGN PATENT DOCUMENTS

JP    4913880 B2    4/2012

OTHER PUBLICATIONS

U.S. Appl. No. 15/676,363, filed Aug. 14, 2017 Inventors: Kiyohiro Sogen et al.

* cited by examiner

*Primary Examiner* — Dale W Hilgendorf
(74) *Attorney, Agent, or Firm* — Dinsmore & Shohl LLP

(57) ABSTRACT

An information processing apparatus includes: a storage unit; and a control unit configured to acquire the locations of the plurality of autonomous driving vehicles on the map and the difficulty state information from the vehicles through communication, totalize the number of reports on the difficulty state information for each of levels of difficulty in each of traveling sections based on the vehicles locations and difficulty state information stored in the storage unit, determine whether the totalized number is equal to or more than a threshold value for each of the levels of difficulty and determine a traveling section, where at least one of the numbers of reports is equal to or more than the threshold value, as an autonomous driving difficult section, distribute to the vehicles the autonomous driving difficult section, and (Continued)

| LEVEL OF DIFFICULTY | CONTENT | THRESHOLD |
|---|---|---|
| LOW | UNSTEADY LEVEL | 20 |
| LOW+ | OCCURRENCE OF HANDS-ON DRIVING | 10 |
| MIDDLE | OCCURRENCE OF OVERRIDE | 5 |
| MIDDLE+ | OCCURRENCE OF OVERRIDE + SUDDEN STEERING AND RAPID DECELERATION-ACCELERATION | 2 |
| HIGH | EMERGENCY SHUT DOWN | 1 | determine the autonomous driving difficult section with a smaller threshold value as the level of difficulty is higher.

11 Claims, 9 Drawing Sheets

(51) Int. Cl.
| | |
|---|---|
| *B60W 40/06* | (2012.01) |
| *B60W 40/02* | (2006.01) |
| *B60W 40/105* | (2012.01) |
| *G05D 1/00* | (2006.01) |
| *G05D 1/02* | (2006.01) |
| G01C 21/32 | (2006.01) |
| G08G 1/00 | (2006.01) |

(52) U.S. Cl.
CPC ..... *G05D 1/0276* (2013.01); *B60W 2550/408* (2013.01); *G01C 21/32* (2013.01); *G08G 1/00* (2013.01)

FIG. 3

| LEVEL OF DIFFICULTY | SECTION A | SECTION B | SECTION C | SECTION D | SECTION E | SECTION F | SECTION G |
|---|---|---|---|---|---|---|---|
| LOW | 10 | 40 | 0 | 0 | 0 | 0 | 0 |
| LOW+ | 0 | 0 | 5 | 0 | 0 | 20 | 2 |
| MIDDLE | 2 | 0 | 0 | 0 | 6 | 0 | 2 |
| MIDDLE+ | 2 | 0 | 1 | 0 | 0 | 0 | 0 |
| HIGH | 0 | 0 | 1 | 0 | 0 | 0 | 0 |

FIG. 4

| LEVEL OF DIFFICULTY | CONTENT | THRESHOLD |
|---|---|---|
| LOW | UNSTEADY LEVEL | 20 |
| LOW+ | OCCURRENCE OF HANDS-ON DRIVING | 10 |
| MIDDLE | OCCURRENCE OF OVERRIDE | 5 |
| MIDDLE+ | OCCURRENCE OF OVERRIDE + SUDDEN STEERING AND RAPID DECELERATION-ACCELERATION | 2 |
| HIGH | EMERGENCY SHUT DOWN | 1 |

FIG. 8

| LEVEL OF DIFFICULTY | WEIGHT |
| --- | --- |
| LOW | 1 |
| LOW+ | 2 |
| MIDDLE | 5 |
| MIDDLE+ | 10 |
| HIGH | 20 |

INFORMATION PROCESSING APPARATUS

CROSS-REFERENCE TO RELATED APPLICATIONS

This application claims priority to Japanese Patent Application No. 2016-166058 filed on Aug. 26, 2016 which is incorporated herein by reference in its entirety.

BACKGROUND

1. Technical Field

The present disclosure relates to an information processing apparatus.

2. Description of Related Art

U.S. Pat. No. 8,509,982 discloses a vehicle capable of communication. The vehicle informs a driver that the vehicle is approaching an area where autonomous driving is difficult (a section where autonomous driving is difficult) with reference to a map storing areas where autonomous driving is difficult. The sections where autonomous driving is difficult may be set by drivers. For example, when a driver notices temporary construction, the driver sets the site of the temporary construction as a section where autonomous driving is difficult. The information on the section where autonomous driving is difficult is shared with the other vehicles through a network.

SUMMARY

In the vehicles disclosed in U.S. Pat. No. 8,509,982, the sections where autonomous driving is difficult are preset on a map, which may cause a difference between map data and an actual traveling environment. While the sections where autonomous driving is difficult can be set by drivers, the reliability of the information may become insufficient. The reliability of the information may be enhanced by setting the sections where autonomous driving is difficult after a certain number of reports on the sections are collected. However, it is preferable to promptly set the sections where autonomous driving is difficult and to share the information on the sections with the other vehicles, when the level of difficulty in autonomous driving is very high. In this technology field, there is a demand for an information processing apparatus capable of setting the section where autonomous driving is difficult (autonomous driving difficult section) in consideration of the level of difficulty while securing the reliability of the information.

An information processing apparatus according to a first aspect of the present disclosure is an information processing apparatus capable of communicating with a plurality of autonomous driving vehicles, including: a storage unit configured to store locations of the plurality of autonomous driving vehicles on a map in association with difficulty state information about a level of difficulty in autonomous driving; and a control unit configured to acquire the locations of the plurality of autonomous driving vehicles on the map and the difficulty state information from the plurality of autonomous driving vehicles through communication, totalize the number of reports on the difficulty state information for each of levels of difficulty in each of traveling sections based on the locations and the difficulty state information stored in the storage unit, determine whether the totalized number of the reports is equal to or more than a threshold value for each of the levels of difficulty and determine a traveling section where at least one of the numbers of the reports is equal to or more than the threshold value as an autonomous driving section, and distribute to the autonomous driving vehicles a location of the determined autonomous driving difficult section on the map. The control unit is configured to determine the autonomous driving difficult section with a smaller threshold value as the level of difficulty is higher.

The information processing apparatus uses a smaller threshold value as the level of difficulty is higher. Accordingly, it is possible to determine the autonomous driving difficult section with a smaller number of reports as the level of difficulty is higher. That is, when the reported level of difficulty is very high, the pertinent section can be set as an autonomous driving difficult section at an early stage, and the location of the autonomous driving difficult section on the map can be distributed. When the reported level of difficulty is not very high, the pertinent section is determined as an autonomous driving difficult section after a certain number of reports are accumulated. This makes it possible to secure the reliability of the information. Therefore, it is possible to set the autonomous driving difficult section in consideration of the level of difficulty while securing the reliability of the information.

In one embodiment, the control unit may be configured to distribute to the autonomous driving vehicles the level of difficulty of the difficulty state information of which the number of reports is equal to or more than the threshold value. In this case, it is possible to encourage the autonomous driving vehicles to take action in accordance with the level of difficulty. Furthermore, the level of difficulty in autonomous driving may be a degree of difficulty in the autonomous driving, the level being defined in stages in accordance with circumstances of the autonomous driving.

An information processing apparatus according to a second aspect of the present disclosure is an information processing apparatus capable of communicating with a plurality of autonomous driving vehicles, including: a storage unit configured to store locations of the plurality of autonomous driving vehicles on a map in association with difficulty state information about a level of difficulty in autonomous driving; and a control unit configured to acquire the locations of the plurality of autonomous driving vehicles on the map and the difficulty state information from the plurality of autonomous driving vehicles through communication, totalize the number of reports on the difficulty state information for each of levels of difficulty in each of traveling sections based on the locations and the difficulty state information stored in the storage unit, weight the number of the reports with a weight corresponding to each of the levels of difficulty, determine whether the weighted number of the reports is equal to or more than a threshold value for each of the levels of difficulty, and determine the traveling section where at least one of the weighted number of the reports is equal to or more than the threshold value as an autonomous driving difficult section, and distribute to the autonomous driving vehicles a location of the determined autonomous driving difficult section on the map. The control unit is configured to determine the autonomous driving difficult section with a larger weight as the level of difficulty is higher.

The information processing apparatus makes the weight applied to the number of reports larger as the level of difficulty is higher. Accordingly, it is possible to determine the autonomous driving difficult section with a smaller number of reports as the level of difficulty is higher. That is, when the reported level of difficulty is very high, the pertinent section can be set as the autonomous driving difficult section at an early stage and the location of the autonomous driving difficult section on the map can be distributed. When the reported level of difficulty is not very high, the pertinent section is determined as the autonomous driving difficult section after a certain number of reports are accumulated. This makes it possible to secure the reliability of the information. Therefore, it is possible to set the autonomous driving difficult section in consideration of the level of difficulty while securing the reliability of the information.

In one embodiment, the control unit may be configured to distribute to the autonomous driving vehicles the level of difficulty of the difficulty state information of which the weighted number of reports is equal to or more than the threshold value. In this case, it is possible to encourage the autonomous driving vehicles to take action in accordance with the level of difficulty.

An information processing apparatus according to a third aspect of the present disclosure is an information processing apparatus capable of communicating with a plurality of autonomous driving vehicles, including: a storage unit configured to store locations of the plurality of autonomous driving vehicles on a map in association with difficulty state information about a level of difficulty in autonomous driving; and a control unit configured to acquire the locations of the plurality of autonomous driving vehicles on the map and the difficulty state information about the level of difficulty in autonomous driving from the plurality of autonomous driving vehicles through communication, totalize the number of reports on the difficulty state information for each of levels of difficulty in each of traveling sections based on the locations and the difficulty state information stored in the storage unit, calculate a score of each of the traveling sections by weighting and summing the totalized number of the reports for each of the levels of difficulty with a weight corresponding to each of the levels of difficulty and determine the traveling section where the score is equal to or more than a threshold value as an autonomous driving section, and distribute to the autonomous driving vehicles a location of the determined autonomous driving difficult section on the map. The control section is configured to determine the autonomous driving difficult section with a larger weight as the level of difficulty is higher.

The information processing apparatus can make the score used for determination of the autonomous driving difficult section larger as the level of difficulty is higher. That is, when the reported level of difficulty is very high, the pertinent section can be determined as the autonomous driving difficult section even with the number of reports being small. When the reported level of difficulty is not very high, the pertinent section can be determined as the autonomous driving difficult section after a certain number of reports are accumulated. Therefore, it is possible to set the autonomous driving difficult section in consideration of the level of difficulty while securing the reliability of the information.

According to various aspects and embodiments of the present disclosure, it is possible to set the autonomous driving difficult section in consideration of the level of difficulty while securing the reliability of the information.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is one example of totalization data;

FIG. 4 is one example of a threshold table;

FIG. 8 is one example of a weight table; and

DETAILED DESCRIPTION OF EMBODIMENTS

Figure 1:
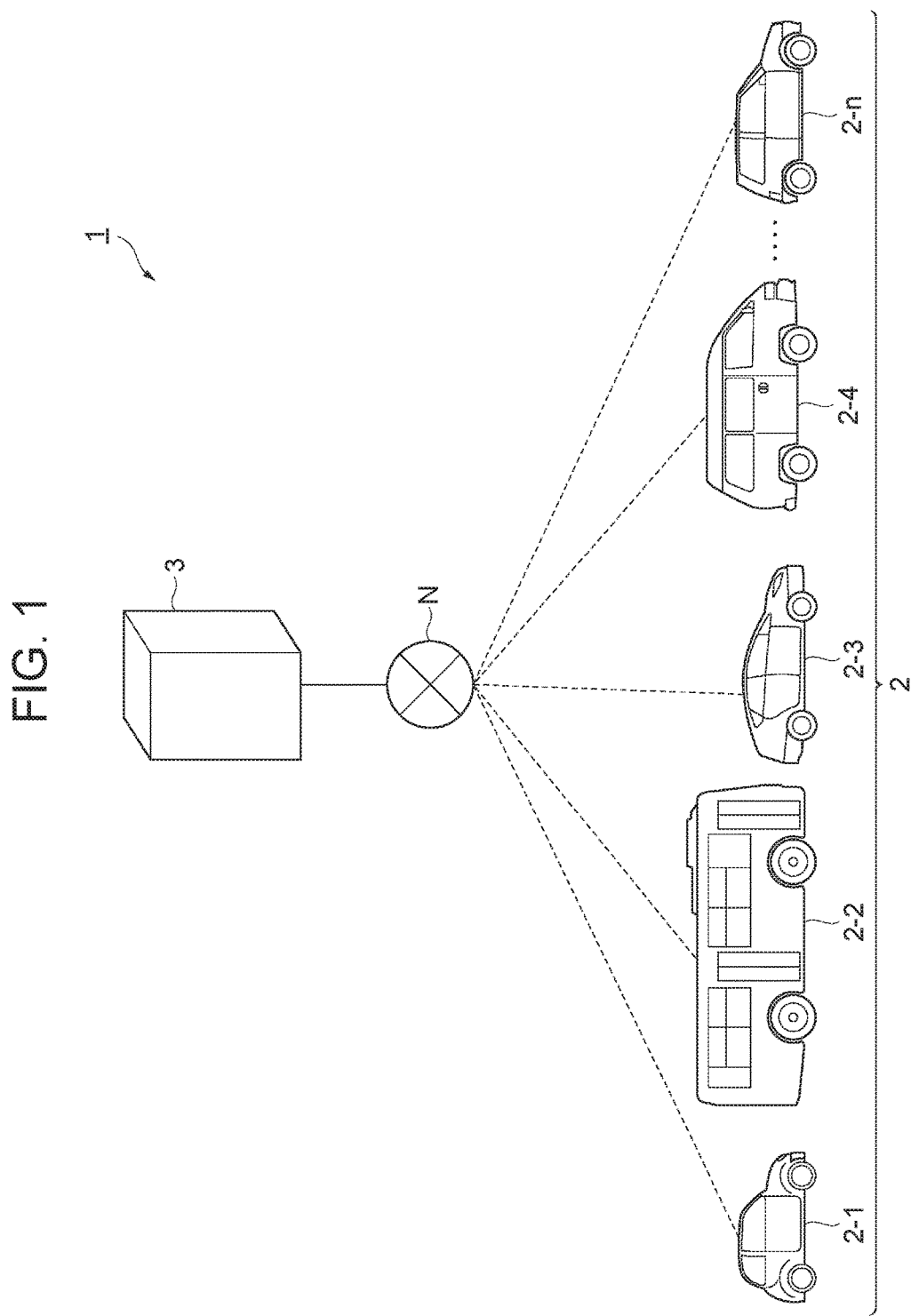
FIG. 1 is an explanatory view of a vehicle communication system.

Hereinafter, embodiments of the present disclosure will be described with reference to the drawings. In the description below, like or corresponding component members are designated by like reference numerals to omit redundant explanation.

[First Embodiment][Outline of Vehicle Communication System]FIG. 1 is an explanatory view of a vehicle communication system. As illustrated in FIG. 1, a vehicle communication system 1 includes a plurality of vehicles 2 and a server 3.

The plurality of vehicles 2 include a vehicle 2-1 to vehicle 2-n. The value of n is a natural number larger than one. The vehicle 2-1 to vehicle 2-n are vehicles including a two-way communication function. The vehicle 2 includes an autonomous driving function. The vehicle 2 includes well-known component members, such as a speed sensor, necessary for traveling. The vehicle 2 travels on a road by operating an actuator and the like by driving operation of a driver or by an autonomous driving function. The vehicle 2-1 to vehicle 2-n are configured to be able to communicate with the server 3 through a network N. For example, the network N is the Internet or a privately leased line.

The server 3 acquires information from the plurality of vehicles 2 through the network N. The server 3 acquires and collects information, such as a location, a speed, sensor information, operating information on a travel system or onboard equipment, reliability of autonomous driving by an autonomous driving system, and the number of times that the autonomous driving is overridden (one example of a driver intervention result) acquired from the plurality of vehicles 2. The server 3 also acquires information such as traffic congestion information, obstacle information, and service area information from other servers, and distributes the acquired information to the plurality of vehicles 2. The server 3 can also distribute information in response to requests from the plurality of vehicles 2. Thus, the plurality of vehicles 2 can share information through the server 3. The server 3 may also communicate with vehicles other than the autonomous driving vehicles.

The information that the plurality of vehicles 2 should share includes sections where autonomous driving is difficult. The sections where autonomous driving is difficult are sections set on the map where autonomous driving is difficult. The sections where autonomous driving is difficult include sections where autonomous driving is prohibited and sections where autonomous driving is difficult. Examples of the sections where autonomous driving is prohibited include sections blocked due to temporary construction, sections where weather is worsened, and sections where merging in autonomous driving frequently fails. Difficulty in autonomous driving signifies that the vehicles fail to implement normal traveling as autonomous driving. Examples of the difficulty in autonomous driving include autonomous steering of the vehicle 2 being unsteady, the vehicle 2 being unable to travel at the center of a lane, the speed of the vehicle 2 having extreme fluctuation, the speed of the vehicle 2 being unstable, the speed exceeding a limit speed of autonomous driving control in curves, intervention operation being frequently performed by a driver of the vehicle, and an emergency shutdown system (such as a pre-crash safety system (PCS)) being actuated.

The sections where autonomous driving is difficult are set by the server 3 based on the information acquired from the plurality of vehicles 2 (information reported from the plurality of vehicles 2). Setting the sections where autonomous driving is difficult signifies associating the location information with the information indicative of the sections where autonomous driving is difficult.

The server 3 stores locations of the sections where autonomous driving is difficult on the map. The server 3 can distribute the locations of the sections where autonomous driving is difficult to the plurality of vehicles 2. Accordingly, the information on the sections where autonomous driving is difficult is shared by the plurality of vehicles 2. The vehicles 2 may inform drivers that the vehicles 2 are approaching the sections where autonomous driving is difficult, or may advice the drivers to travel in the sections where autonomous driving is difficult by manual driving.

Figure 2:
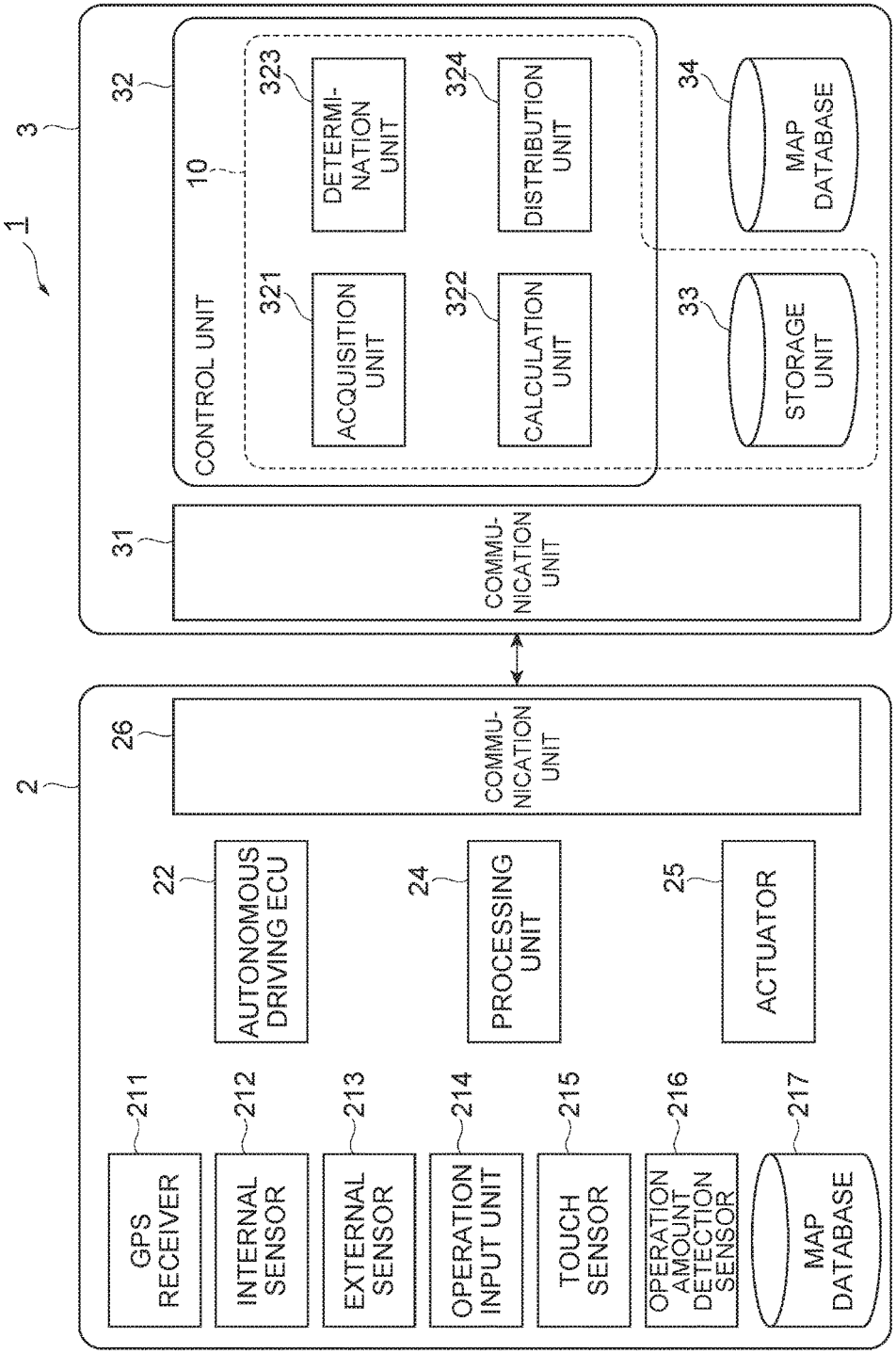
FIG. 2 is a block diagram illustrating the configuration of a vehicle communication system.

[Detailed Configuration of Vehicle Communication System][Vehicle]FIG. 2 is a block diagram illustrating the configuration of a vehicle communication system 1. As illustrated in FIG. 2, the vehicle 2 includes, for example, a global positioning system (GPS) receiver 211, an internal sensor 212, an external sensor 213, an operation input unit 214, a touch sensor 215, an operation amount detection sensor 216, a map database 217, an autonomous driving electronic control unit (ECU) 22, a processing unit 24, an actuator 25, and a communication unit 26.

The GPS receiver 211 is a device that receives GPS signals. The GPS receiver 211 receives signals from three or more GPS satellites to measure the location of the vehicle 2. For example, the location of the vehicle 2 is expressed as location information, such as a latitude and a longitude. The GPS receiver 211 transmits the measured location information on the vehicle 2 to the autonomous driving ECU 22 and the processing unit 24.

The internal sensor 212 is a detector that detects a motion state of the vehicle 2. One example of the internal sensor 212 includes a vehicle speed sensor, an acceleration sensor, and a yaw rate sensor. The vehicle speed sensor is a detector that detects the speed of the vehicle 2. One example of the vehicle speed sensor is a wheel speed sensor. The acceleration sensor is a detector that detects acceleration of the vehicle 2. One example of the acceleration sensor is a sensor that uses a weight supported by a spring to detect acceleration from a displacement amount of the spring. The yaw rate sensor is a detector that detects the yaw rate of the vehicle 2. One example of the yaw rate sensor is a gyro sensor. The internal sensor 212 transmits the motion state of the vehicle 2 to the autonomous driving ECU 22 and the processing unit 24.

The external sensor 213 is a detector that detects circumstances around the vehicle 2. For example, the external sensor 213 includes a camera, a radar, and a laser imaging detection and ranging (LIDAR). The camera is an imaging device that images external circumstances of the vehicle 2. The radar is a detector that detects an obstacle outside the vehicle 2 using electric waves (such as millimeter waves). The LIDAR is a detector that detects an obstacle outside the vehicle 2 using light. The external sensor 213 transmits the circumstances around the vehicle 2 to the autonomous driving ECU 22 and the processing unit 24.

The operation input unit 214 is a device that receives operation by the driver. Examples of the operation input unit 214 include a steering wheel that receives steering operation, a brake pedal that receives brake operation, and an accelerator pedal that receives accelerator operation. The operation input unit 214 transmits a signal corresponding to the driving operation to the actuator 25.

The touch sensor 215 is a device that senses the driver coming into contact with the operation input unit 214. One example of the touch sensor 215 is a pressure-sensitive sensor provided in the steering wheel of the vehicle 2 to detect contact of the driver with the steering wheel and to detect the pressure of the driver gripping the steering wheel. The touch sensor 215 transmits to the autonomous driving ECU 22 and the processing unit 24 contact information and pressure information of the driver with respect to the operation input unit 214.

The operation amount detection sensor 216 detects the operation amount of acceleration and deceleration operation and the operation amount of steering operation by the driver of the vehicle 2. For example, the operation amount detection sensor 216 includes at least one of an accelerator pedal sensor, a brake pedal sensor, and a steering sensor.

The accelerator pedal sensor is a detector that detects a stepping-in amount of the accelerator pedal. For example, the stepping-in amount of the accelerator pedal is a position (pedal position) of the accelerator pedal with a specified position as a reference. For example, the accelerator pedal sensor may be attached to a shaft portion of the accelerator pedal of the vehicle 2. The accelerator pedal sensor transmits a signal corresponding to the stepping-in amount of the accelerator pedal to the autonomous driving ECU 22 and the processing unit 24.

The brake pedal sensor is a detector that detects the stepping-in amount of the brake pedal. The brake pedal sensor may detect the operating force (such as tread force applied to the brake pedal, and pressure of a master cylinder) of the brake pedal. The brake pedal sensor transmits a signal corresponding to the stepping-in amount or the operating force of the brake pedal to the autonomous driving ECU 22 and the processing unit 24.

The steering sensor is a detector that detects a rotating state of the steering. For example, a rotating state detection value is a steering torque or a rudder angle (an operation amount of steering operation). For example, the steering sensor is attached to a steering shaft of the vehicle 2. The steering sensor transmits a signal corresponding to a steering torque or a rudder angle of the steering to the autonomous driving ECU 22 and the processing unit 24.

The map database 217 is a database that stores map information. The map information is the data with which a map can be created. The map information includes information such as location information on roads, information on road geometries (such as types of curves and straight roads, and curvature of the curves), width information on the roads, height information on the roads, location information on junctions and branch points, and location information on buildings. The map database 217 may be synchronized with a later-described map database 34 of the server 3 at specified intervals.

The autonomous driving ECU 22 is an electronic control unit having an arithmetic unit such as a central processing unit (CPU), a storage device such as a read only memory (ROM) and a random access memory (RAM), a controller area network (CAN) communication circuit, and the like. The autonomous driving ECU 22 has later-described functions implemented when the CPU of the autonomous driving ECU 22 loads and executes programs stored in the storage device.

The autonomous driving ECU 22 is mounted on the vehicle 2 to execute autonomous driving of the vehicle 2. The autonomous driving is vehicle control to cause autonomous traveling of the vehicle without driving operation of the driver. Society of automotive engineers (SAE) J3016 prescribes levels of driving automation in accordance with the degree of autonomous driving.

The autonomous driving ECU 22 generates a travel plan along a target route preset based on the location information on the vehicle 2 in the GPS receiver 211, the map information in the map database 217, and the detection results of the internal sensor 212 and the external sensor 213. The target route is set by the driver or a publicly known navigation system. The autonomous driving ECU 22 executes autonomous driving in accordance with the travel plan. The autonomous driving ECU 22 executes autonomous driving by transmitting a control signal to the actuator of the vehicle 2. The autonomous driving ECU 22 generates the travel plan with a well-known technique and also executes autonomous driving. The autonomous driving ECU 22 transmits control signals of steering and acceleration and deceleration during autonomous driving to the processing unit 24. The, autonomous driving ECU 22 may find it difficult to generate the travel plan. For example, in converging portions or branch portions, it may be impossible to generate the travel plan depending on the traveling status of other vehicles. When generation of the travel plan is failed, the autonomous driving ECU 22 transmits a signal indicative of planning failure to the processing unit 24.

When a preset termination condition of autonomous driving is satisfied, the autonomous driving ECU 22 ends the autonomous driving and shifts the vehicle 2 to manual driving. The manual driving is a driver-oriented driving mode in which the vehicle travels based on driving operation by the driver. The termination condition of the autonomous driving includes a condition where intervention operation by the driver is performed. The autonomous driving ECU 22 determines whether or not driver intervention operation is present based on a signal output by the operation amount detection sensor 216. The autonomous driving ECU 22 transmits to the processing unit 24 the determination result as a driver intervention result. The driver intervention result is the information about the intervention operation by the driver. The information includes the presence of intervention operation and types (steering operation, brake operation, accelerator operation) of the intervention operation. The autonomous driving ECU 22 also transmits an autonomous driving end signal to the processing unit 24.

The processing unit 24 is a control unit which is an electronic control unit having an arithmetic unit such as a CPU, a storage device such as a ROM and a RAM, a CAN communication circuit, and the like. The processing unit 24 uses the location of the vehicle 2 on the map obtained by using the location information acquired from the GPS receiver 211 and the map in the map database 217, as well as some or all of the information (also referred to as acquired data below) output from the internal sensor 212, the external sensor 213, the touch sensor 215, the operation amount detection sensor 216, and the autonomous driving ECU 22 to generate reporting data. The reporting data is the data output to the server 3, the data including the location of the vehicle 2 on the map, the difficulty state information about the level of difficulty in autonomous driving.

The level of difficulty is a degree of the difficulty in autonomous driving. For example, the level of difficulty may be expressed or defined as a stepwise magnitude of difficulty in autonomous driving. For example, the level of difficulty may be expressed as categories, such as "low", "low+", "middle", "middle+", and "high". Such categories and the contents of difficulty are associated in advance with each other through a definition table or the like. For example, the level of difficulty "low" may be defined as the level where the vehicle 2 is unsteady. Such "unsteady traveling" is determined with fluctuation of a steering control signal output by the autonomous driving ECU 22 or fluctuation of the acceleration acquired by the internal sensor 212, for example. For example, the level of difficulty "low+" may be defined as the level where hands-on driving (Hands-On) occurs without a request of the autonomous driving ECU 22. Such "Hands-On" is determined by using the control signal of the autonomous driving ECU 22 and the detection result of the touch sensor 215, for example. The level of difficulty "middle" may be defined as the level where override (driver intervention in autonomous driving) occurs, for example. Such "override" is determined by using the control signal of the autonomous driving ECU 22 and the detection result of the operation amount detection sensor 216, for example. The level of difficulty "middle+" may be defined as the level where override occurs and sudden steering or sudden acceleration and deceleration occurs, for example. Such circumstances are determined with the control signal of the autonomous driving ECU 22, and the detection result of the operation amount detection sensor 216, for example. The level of difficulty "high" may be defined as the level where emergency shutdown occurs, for example. Such circumstances are determined by using the control signal (signal indicative of planning failure) of the autonomous driving ECU 22, for example. When the vehicle 2 incorporates an emergency shutdown system (such as PCS) that is actuated upon emergency shutdown, the level of difficulty may be determined by using operation data on the emergency shutdown system.

The difficulty state information is data about the level of difficulty. The difficulty state information may be data indicative of the level of difficulty, such as "low", "low+", "middle", "middle+", and "high", or may be source data (acquired data of the vehicle 2) to determine the level of difficulty. When the vehicle 2 includes the level of difficulty in reporting data, the level of difficulty is determined by the vehicle 2 side. The vehicle 2 outputs the level of difficulty with reference to the definition table prestored in the vehicle 2 and based on the acquired data. When the vehicle 2 includes the source data in the reporting data, the level of difficulty is not determined by the vehicle 2 side but is determined by the server 3 side.

As described in the foregoing, the location on the map is the location on the map in the map database 217, the locating being the location of the vehicle 2 on the map when the aforementioned reporting data is generated, or the location of the vehicle 2 on the map when the aforementioned driver intervention is performed.

The processing unit 24 transmits the reporting data to the server 3 through the communication unit 26. The processing unit 24 may create the reporting data of one cycle by using the information in a predetermined period and transmit the reporting data to the server 3 in a specified cycle, or may transmit the accumulated reporting data in response to a request of the server 3. The communication unit 26 is a communication device in conformity with communications protocols of the network N. The processing unit 24 also outputs a request signal to request information to the server 3 through the communication unit 26, and acquires the information from the server 3.

The actuator 25 is a device that executes traveling control of the vehicle 2. The actuator 25 includes at least a well-known engine actuator, brake actuator, and steering actuator. The actuator 25 operates based on a signal from the operation input unit 214, or a control signal from the autonomous driving ECU 22. [Server]The server 3 can communicate with the vehicles 2. In one example, the server 3 includes a communication unit 31, a control unit 32, a storage unit 33, and a map database 34.

The communication unit 31 is a communication device in conformity with the communications protocols of the network N. The control unit 32 is an arithmetic unit such as CPU. Functionally, the control unit 32 includes an acquisition unit 321, a calculation unit 322, a determination unit 323, and a distribution unit 324. The information processing apparatus 10, which includes the acquisition unit 321, the calculation unit 322, the determination unit 323, the distribution unit 324, and the storage unit 33, can communicate with the plurality of vehicles 2.

The acquisition unit 321 acquires the reporting data from the plurality of vehicles 2 through communication. The acquisition unit 321 acquires the reporting data from the vehicles 2 through the network N and the communication unit 31. The acquisition unit 321 may acquire the reporting data transmitted from the vehicles 2 in a specified cycle, or may request the reporting data from the vehicles 2 at specified timing. The acquisition unit 321 accumulates the acquired reporting data in the storage unit 33. The storage unit 33 stores the locations of the vehicles 2 on the map acquired by the acquisition unit 321 in association with the difficulty state information. For example, the acquisition unit 321 may accumulate the reporting data in association with acquisition time in the storage unit 33, or may accumulate the reporting data in association with acquisition time for each section (location) in the storage unit 33.

The calculation unit 322 totalizes the number of reports on the difficulty state information for each level of difficulty in each traveling section based on the locations and the difficulty state information stored in the storage unit 33. First, when the difficulty state information is not the level of difficulty itself, the calculation unit 322 calculates the level of difficulty based on the difficulty state information (source data) and the definition table, and associates the level of difficulty with the reporting data. Next, the calculation unit 322 counts the reporting data for each traveling section. The calculation unit 322 then totalizes the number of reports on the difficulty state information for each level of difficulty in each traveling section. FIG. 3 is one example of totalization data. In FIG. 3, traveling sections "section A", "section B", "section C", "section D", "section E", "section F", and "section G" are set as totalization targets. The levels of difficulty to be totalized include the levels "low", "low+", "middle", "middle+" and high". When there is a report with the level of difficulty "low" in the traveling section "section A", the calculation unit 322 increments the number of reports on the level of difficulty "low" in the traveling section "section A" by one. Thus, the calculation unit 322 completes the totalization data.

In the totalization data illustrated in FIG. 3, in the "section A", the total number of reports with the level of difficulty "low" is 10. The total numbers of reports with the levels of difficulty "middle" and "middle+" are two, respectively. The total numbers of reports with the levels of difficulty "low+" and "high" are zero, respectively. In the "section B", the total number of reports with the level of difficulty "low" is 40. The total numbers of reports with the levels of difficulty "low+", "middle", middle+" and "high" are zero, respectively. In the "section C", the total number of reports with the level of difficulty "low+" is five. The total numbers of reports with the levels of difficulty "middle+" and "high" are one, respectively. The total numbers of reports with the levels of difficulty "low" and "middle" are zero, respectively. In the "section D", the total numbers of reports with the levels of difficulty "low", "low+", "middle", middle+" and "high" are zero, respectively. In the "section E", the total number of reports with the level of difficulty "middle" is six. The total numbers of reports with the levels of difficulty "low", "low+", "middle", middle+" and "high" are zero, respectively. In the "section F", the total number of reports with the level of difficulty "low+" is 20. The total numbers of reports with the levels of difficulty "low", "middle", middle+" and "high" are zero, respectively. In the "section G", the total numbers of reports with the levels of difficulty "low+" and "middle" are two, respectively. The total numbers of reports with the levels of difficulty "low", middle+" and "high" are zero, respectively. Thus, the calculation unit 322 totalizes the number of reports for each level of difficulty in each traveling section.

The calculation unit 322 may totalize the number of reports at the timing when the acquisition unit 321 acquires the reporting data, or may totalize the number of reports at specified timing (at specified intervals, for example).

The determination unit 323 determines the section where autonomous driving is difficult (autonomous driving difficult section) based on the number of reports totalized by the calculation unit 322. Specifically, the determination unit 323 compares the number of reports with a threshold value to determine the autonomous driving difficult section. The threshold value is a value used as a reference for determining the autonomous driving difficult section, the value being preset for each autonomous driving difficult section. In one example, the determination unit 323 acquires the threshold value for each autonomous driving difficult section with reference to a threshold table in which the levels of difficulty are associated with the threshold values.

FIG. 4 is one example of the threshold table. As illustrated in FIG. 4, the levels of difficulty are associated with the threshold values. For example, the level of difficulty "low" is associated with a threshold value "20", the level of difficulty "low+" is associated with a threshold value "10", the level of difficulty "middle" is associated with a threshold value "5", the level of difficulty "middle+" is associated with a threshold value "2", and the level of difficulty "high" is associated with a threshold value "1". Thus, as the level of difficulty is higher, a smaller threshold value is set.

For example, the determination unit 323 acquires the threshold value for each level of difficulty with reference to the threshold table illustrated in FIG. 4, and compares the threshold value and the number of reports for each level of difficulty to determine the autonomous driving difficult section. Specifically, the determination unit 323 determines whether or not the number of reports totalized by the calculation unit 322 is more than the threshold value for each level of difficulty.

Now, the totalization data of FIG. 3 is used as an example. In the "section A", the numbers of reports with the levels of difficulty "low", "low+", "middle", and "high" are below the threshold value of each level of difficulty. The number of reports with the level of difficulty "middle+" is "two", which is equal to or more than the threshold value "2" of the level of difficulty "middle+". In the "section B", the numbers of reports with the levels of difficulty "low+", "middle", "middle+", and "high are below the threshold value of each level of difficulty. The number of reports with the level of difficulty "low" is "40", which is equal to or more than the threshold value "20" of the level of difficulty low". In the "section C", the numbers of reports with the levels of difficulty "low", "low+", "middle", and "middle+" are below the threshold value of each level of difficulty. The number of reports with the level of difficulty "high" is "one", which is equal to or more than the threshold value "1" of the level of difficulty "high". In the "section D", the numbers of reports with the levels of difficulty "low", "low+", "middle", middle+" and "high" are below the threshold value of each level of the difficulty. In the "section E", the numbers of reports with the levels of difficulty "low", "low+", "middle+", and "high" are below the threshold value of each level of difficulty. The number of reports with the level of difficulty "middle" is "six", which is equal to or more than the threshold value "5" of the level of difficulty "middle". In the "section F", the numbers of reports with the levels of difficulty "low", "middle", "middle+", and "high are below the threshold value of each level of difficulty. The number of reports with the level of difficulty "low+" is "20", which is equal to or more than the threshold value "10" of the level of difficulty "low+". In the "section G", the numbers of reports with the levels of difficulty "low", "low+", "middle", "middle+" and "high" are below the threshold value of each level of difficulty.

The determination unit 323 determines as the autonomous driving difficult section the traveling section where at least one of the numbers of reports is equal to or more than the threshold value. When the totalization data of FIG. 3 is used as an example, the "section A" is determined as an autonomous driving difficult section with the level of difficulty "middle+", the "section B" is determined as an autonomous driving difficult section with the level of difficulty "low", the "section C" is determined as an autonomous driving difficult section with the level of difficulty "high", the "section E" is determined as an autonomous driving difficult section with the level of difficulty "middle", and the "section F" is determined as an autonomous driving difficult section with the level of difficulty "low+". The determination unit 323 does not determine the "section D" and the "section G" as the autonomous driving difficult section.

Figure 5:
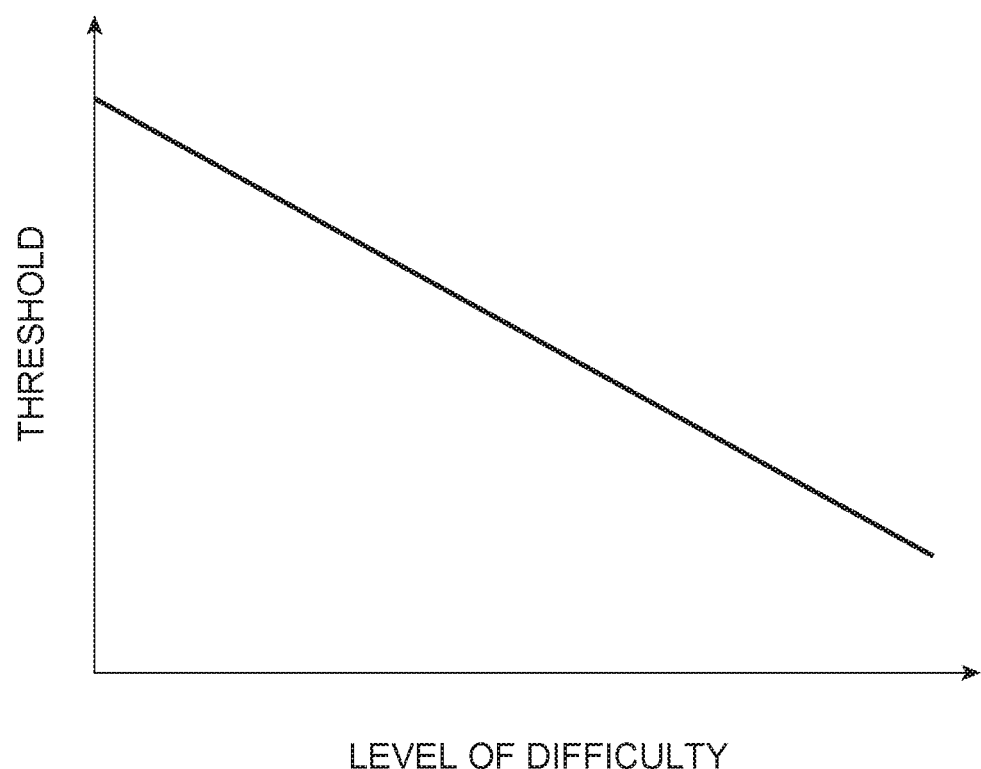
FIG. 5 is one example of a function that determines a threshold value.

In another example, the determination unit 323 may use a specified function and adopt a smaller threshold as the level of difficulty is higher. FIG. 5 is one example of a function that determines the threshold value. In a graph illustrated in FIG. 5, a horizontal axis represents the level of difficulty and a vertical axis represents the threshold value. The determination unit 323 may use a monotonically decreasing function with the level of difficulty as illustrated in FIG. 5 as a parameter to determine a smaller threshold value as the level of difficulty is higher.

When an autonomous driving difficult section is set, the distribution unit 324 transmits the location of the autonomous driving difficult section on the map to the vehicles 2. Accordingly, the location of the autonomous driving difficult section is shared by the plurality of vehicles 2. The distribution unit 324 also transmits requested data to the vehicles 2 through the communication unit 31. For example, when there is an inquiry about an autonomous driving difficult section from the vehicle 2, the distribution unit 324 transmits the location of the autonomous driving difficult section to the vehicle 2 through the communication unit 31.

The distribution unit 324 may distribute to the vehicles 2 the level of difficulty of the difficulty state information with number of reports becomes equal to or more than the threshold value. That is, the distribution unit 324 distributes not only the location of the autonomous driving difficult section but also the level of difficulty of the autonomous driving difficult section together with the location. This makes it possible to encourage the vehicles 2 to provide support corresponding to the level of difficulty. For example, when the distributed levels of difficulty are "middle", "middle+", and "high", the vehicles 2 can provide a message to encourage the drivers to override the autonomous driving in the autonomous driving difficult section in advance. For example, when the distributed level of difficulty is "low+", the vehicles 2 can provide a message to encourage the drivers to perform hands-on driving in the autonomous driving difficult section. For example, when the distributed level of difficulty is "low", the vehicles 2 may choose to provide no message to the drivers.

The map database 34 is identical in configuration to the map database 217 of the vehicles 2. The map database 34 may be synchronized with the map database 217 of the vehicles 2 at specified intervals.

Figure 6:
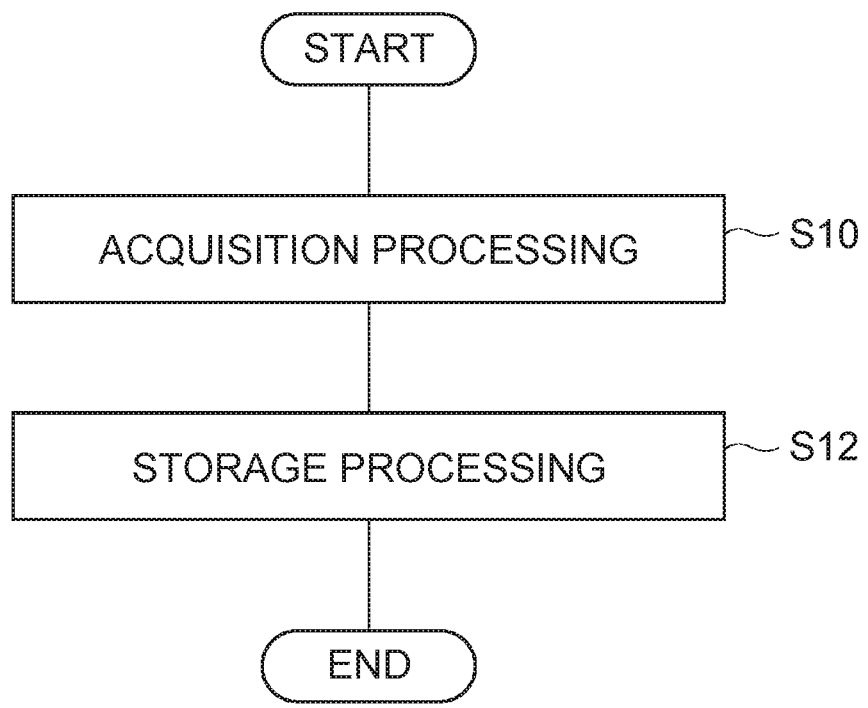
FIG. 6 is a flowchart of acquisition processing.

[Flowchart]FIG. 6 is a flowchart of the acquisition processing of the information processing apparatus 10. The flowchart is started at the time when an instruction to operate the information processing apparatus 10 is received.

As illustrated in FIG. 6, the acquisition unit 321 of the information processing apparatus 10 performs acquisition processing (S10) to acquire reporting data from the vehicle 2. Next, the acquisition unit 321 performs storage processing (S12) to accumulate the reporting data together with acquisition time in the storage unit 33. That is the end of the flowchart. Once the flowchart is ended, the flowchart may be started at specified timing. In this case, the reporting data is stored in chronological order.

Figure 7:
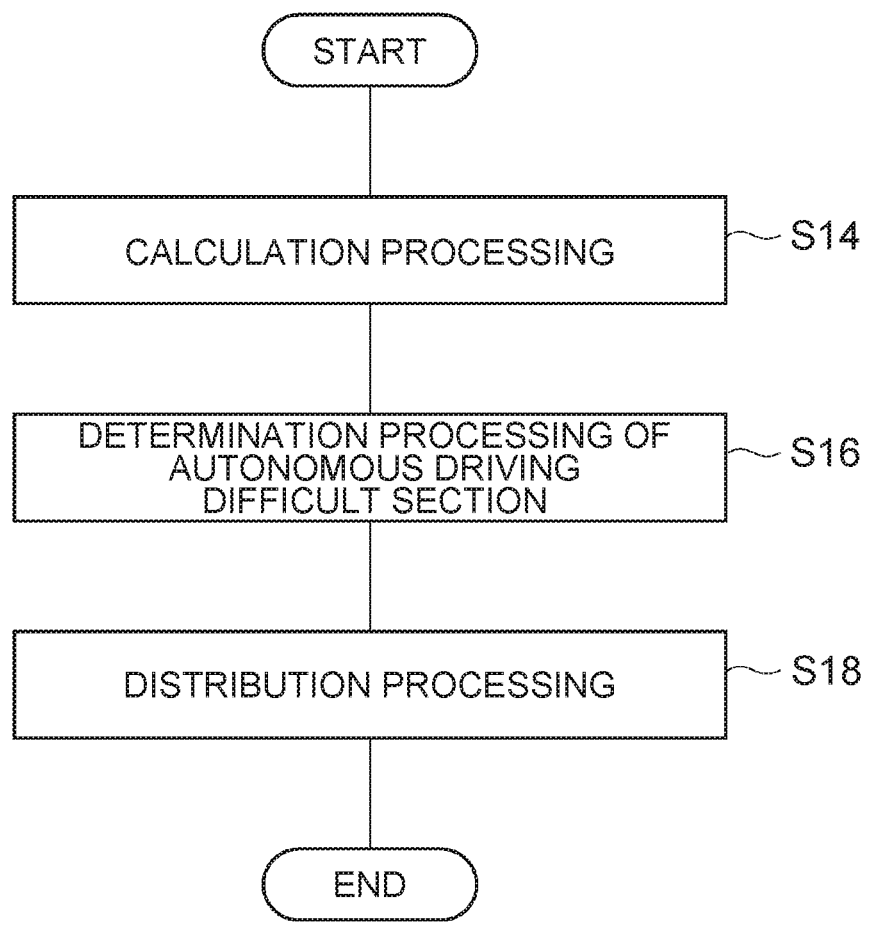
FIG. 7 is a flowchart of distribution processing of the autonomous driving difficult section.

FIG. 7 is a flowchart of distribution processing of the autonomous driving difficult section in the information processing apparatus 10. The flowchart is executed after the flowchart illustrated in FIG. 6 is executed at least once. The flowchart may be performed in parallel to the flowchart illustrated in FIG. 6.

As illustrated in FIG. 7, the calculation unit 322 of the information processing apparatus 10 performs calculation processing (S14) to totalize the number of reports on the difficulty state information for each level of difficulty in each traveling section. Next, the determination unit 323 of the information processing apparatus 10 performs determination processing (S16) of the autonomous driving difficult section to determine whether or not the totalized number of reports is equal to or more than a threshold value for each level of difficulty, and determine as the autonomous driving difficult section the traveling section where at least one of the numbers of reports is equal to or more than the threshold value. Next, the distribution unit 324 of the information processing apparatus 10 distributes the location of the determined autonomous driving difficult section on the map to the vehicles 2. When the distribution processing (S18) is ended, the flowchart illustrated in FIG. 7 is ended.

As described in the foregoing, the information processing apparatus 10 according to the first embodiment uses a smaller threshold value as the level of difficulty is higher. Accordingly, it is possible to determine the autonomous driving difficult section with a smaller number of reports as the level of difficulty is higher. That is, when the reported level of difficulty is very high, the pertinent section can be set as an autonomous driving difficult section at an early stage and the location of the autonomous driving difficult section on the map can be distributed. When the reported level of difficulty is not very high, the pertinent section is determined as an autonomous driving difficult section after a certain number of reports are accumulated. This makes it possible to secure the reliability of information. Therefore, it is possible to set the autonomous driving difficult section in consideration of the level of difficulty while securing the reliability of the information.

[Second Embodiment] An information processing apparatus according to a second embodiment is similar to the information processing apparatus 10 according to the first embodiment except for the function of the determination unit 323. Hereinafter, a description is mainly given of a difference between the first embodiment and the second embodiment while a description of the portions similar to the first embodiment is omitted.

The information processing apparatus according to the second embodiment is similar in configuration to the information processing apparatus 10 according to the first embodiment. In the first embodiment, the determination unit 323 determines the number of reports with the threshold value different for each level of difficulty. In the second embodiment, the determination unit 323 weights the number of reports for each level of difficulty, and determines the number of reports with a common threshold value (constant). The common threshold value refers to a threshold value that is unchanged when the level of difficulty varies.

The determination unit 323 weights the number of reports totalized by the calculation unit 322 with a weight corresponding to each level of difficulty, and determines whether or not the weighted number of reports is equal to or more than a threshold value for each level of difficulty. The weight corresponding to each level of difficulty is a preset weight that is larger as the level of difficulty is higher.

In one example, the determination unit 323 acquires the threshold value for each autonomous driving difficult section with reference to a weight table in which the levels of difficulty are associated with the weights. FIG. 8 is one example of the weight table. As illustrated in FIG. 8, the levels of difficulty are associated with the threshold values. For example, the level of difficulty "low" is associated with a weight "1", the level of difficulty "low+" is associated with a weight "2", the level of difficulty "middle" is associated with a weight "5", the level of difficulty "middle+" is associated with a weight "10", and the level of difficulty "high" is associated with a weight "20". Thus, as the level of difficulty is higher, a larger weight is set.

For example, the determination unit 323 acquires a weight for each level of difficulty with reference to the weight table illustrated in FIG. 8, and weights the number of reports for each level of difficulty with the acquired weight. When the totalization data illustrated in FIG. 3 is used as an example, in the "section A", the total number of reports with the level of difficulty "low" is 10. The total numbers of reports with the levels of difficulty "middle" and "middle+" are two, respectively. The total numbers of reports with the levels of difficulty "low+" and "high" are zero, respectively. Since the weight for the level of difficulty "low" is "1", the weighted number of reports becomes 10×1=10. Since the weight for the level of difficulty "middle" is "5", the weighted number of reports becomes 2×5=10. Since the weight for the level of difficulty "middle+" is "10", the weighted number of reports becomes 2×10=20. Since the numbers of reports with the levels of difficulty "low+" and "high" are zero, respectively, the weighted numbers of reports become 0×2=0 and 0×20=0, respectively. Similarly, in the "section B", the weighted number of reports for the level of difficulty "low" is 40, and the weighted numbers of reports for the levels of difficulty "low+", "middle", "middle+", and "high" are zero, respectively. In the "section C", the weighted numbers of reports with the levels of difficulty "low", "low+", "middle", "middle+", and "high" are 0, 10, 0, 10 and 10, respectively. In the "section D", the weighted numbers of reports with the levels of difficulty "low", "low+", "middle", "middle+", and "high" are all zero. In the "section E", the weighted numbers of reports with the levels of difficulty "low", "low+", "middle", "middle+", and "high" are 0, 0, 30, 0 and 0, respectively. In the "section F", the weighted numbers of reports with the levels of difficulty "low", "low+", "middle", "middle+", and "high" are 0, 40, 0, 0 and 0, respectively. In the "section G", the weighted numbers of reports with the levels of difficulty "low", "low+", "middle", "middle+", and "high" are 0, 4, 10, 0 and 0, respectively. Thus, the calculation unit 322 weights the number of reports for each level of difficulty in each traveling section.

The determination unit 323 determines whether or not the weighted number of reports totalized by the calculation unit 322 is equal to or more than the threshold value for each level of difficulty. When the threshold value is "20" and the totalization data of FIG. 3 is used as an example, the "section A" is determined as an autonomous driving difficult section with the level of difficulty "middle+", the "section B" is determined as an autonomous driving difficult section with the level of difficulty "low", the "section C" is determined as an autonomous driving difficult section with the level of difficulty "high", the "section E" is determined as an autonomous driving difficult section with the level of difficulty "middle", and the "section F" is determined as an autonomous driving difficult section with the level of difficulty "low+" as in the case of the first embodiment. The determination unit 323 does not determine the "section D" and the "section G" as an autonomous driving difficult section.

Figure 9:
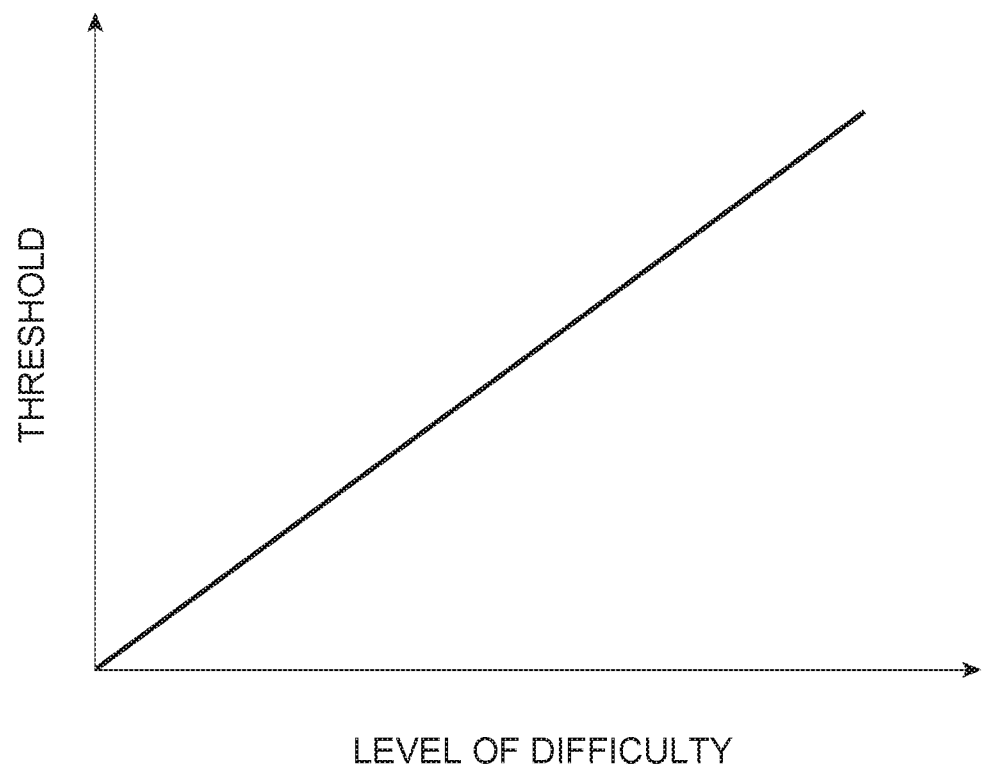
FIG. 9 is one example of a function that determines a weight.

In another example, the determination unit 323 may use a specified function and adopt a larger weight as the level of difficulty is higher. FIG. 9 is one example of a function that determines the weight. In a graph illustrated in FIG. 9, a horizontal axis represents the level of difficulty and a vertical axis represents the weight. The determination unit 323 may use a monotonically increasing function with the level of difficulty as illustrated in FIG. 9 as a parameter to determine a larger weight as the level of difficulty is higher.

Other configuration aspects and processing flows in the second embodiment are similar to those of the information processing apparatus 10 according to the first embodiment.

As described in the foregoing, the information processing apparatus according to the second embodiment uses a larger weight as the level of difficulty is higher. Accordingly, it is possible to determine the autonomous driving difficult section with a smaller number of reports as the level of difficulty is higher. That is, when the reported level of difficulty is very high, the pertinent section can be set as an autonomous driving difficult section at an early stage and the location of the autonomous driving difficult section on the map can be distributed. When the reported level of difficulty is not very high, the pertinent section is determined as an autonomous driving difficult section after a certain number of reports are accumulated. This makes it possible to secure the reliability of information. Therefore, it is possible to set the autonomous driving difficult section in consideration of the level of difficulty while securing the reliability of the information.

[Third Embodiment] An information processing apparatus according to a third embodiment is similar to the information processing apparatus 10 according to the first embodiment except for the function of the determination unit 323. Hereinafter, a description is mainly given of a difference between the first embodiment and the third embodiment while a description of the portions similar to the first embodiment is omitted.

The information processing apparatus according to the third embodiment is similar in configuration to the information processing apparatus 10 according to the first embodiment. In the third embodiment, the determination unit 323 determines the autonomous driving difficult section by using a score obtained by weighting and summing the weight and the number of reports corresponding to each level of difficulty, and a threshold value (constant) for the score.

In one specific example, the determination unit 323 calculates a score for each traveling section by weighting and summing the number of reports for each level of difficulty totalized by the calculation unit 322 with a weight corresponding to each level of difficulty. The weight corresponding to each level of difficulty is a preset weight that is larger as the level of difficulty is higher as in the case of the second embodiment. More specifically, the determination unit 323 may use the weight table illustrated in FIG. 8, or may use a monotonically increasing function with the level of difficulty as illustrated in FIG. 9 as a parameter to determine a larger weight as the level of difficulty is higher. The score is a value for determining the autonomous driving difficult section. Here, as the score is larger, it indicates that the pertinent traveling section is better to be set as the autonomous driving difficult section.

Now, the totalization data illustrated in FIG. 3 is used as an example. In the "section A", the total number of reports with the level of difficulty "low" is 10. The total numbers of reports with the levels of difficulty "middle" and "middle+" are two, respectively. The total numbers of reports with the levels of difficulty "low+" and "high" are zero, respectively. Since the weight for the level of difficulty "low" is "1", the weighted number of reports becomes 10×1=10. Since the weight for the level of difficulty "middle" is "5", the weighted number of reports becomes 2×5=10. Since the weight for the level of difficulty "middle+" is "10", the weighted number of reports becomes 2×10=20. Since the numbers of reports with the levels of difficulty "low+" and "high" are zero, respectively, the weighted numbers of reports become 0×2=0 and 0×20=0, respectively. The determination unit 323 calculates the score by summing the weighted numbers of reports. That is, the score of the "section A" is 10+0+10+20+0=40. Similarly, in the "section B", the weighted number of reports with the level of difficulty "low" is 40, and the weighted numbers of reports with the levels of difficulty "low+", "middle", "middle+", and "high" are zero, respectively. Therefore, the score equals to 40. In the "section C", the weighted numbers of reports with the levels of difficulty "low", "low+", "middle", "middle+" and "high" are 0, 10, 0, 10, and 10, respectively. Therefore, the score equals to 30. In the "section D", the weighted numbers of reports with the levels of difficulty "low", "low+", "middle", "middle+" and "high" are all zero. Therefore, the score equals to zero. In the "section E", the weighted numbers of reports with the levels of difficulty "low", "low+", "middle", "middle+" and "high" are 0, 0, 30, 0, and 0, respectively. Therefore, the score equals to 30. In the "section F", the weighted numbers of reports with the levels of difficulty "low", "low+", "middle", "middle+" and "high" are 0, 40, 0, 0, and 0, respectively. Therefore, the score equals to 40. In the "section G", the weighted numbers of reports with the levels of difficulty "low", "low+", "middle", "middle+" and "high" are 0, 4, 10, 0, and 0, respectively. Therefore, the score equals to 14. Thus, the calculation unit 322 calculates the score weighted and summed for each traveling section.

The determination unit 323 determines the traveling section where the score becomes equal to or more than a threshold value as the autonomous driving difficult section. The threshold value is a value (constant) preset for determination of the score. When the threshold value is "20" and the totalization data of FIG. 3 is used as an example, the "section A", the "section B", the "section C", the "section E", and the "section F" are determined as an autonomous driving difficult section as in the first embodiment. The determination unit 323 does not determine the "section D" and the "section G" as an autonomous driving difficult section.

Other configuration aspects and processing flows in the third embodiment are similar to those of the information processing apparatus 10 according to the first embodiment.

As described in the foregoing, the information processing apparatus according to the third embodiment can make the score used for determination of the autonomous driving difficult section larger as the level of difficulty is higher. That is, when the reported level of difficulty is very high, the pertinent section can be determined as an autonomous driving difficult section even with the number of reports being small. When the reported level of difficulty is not very high, the pertinent section can be determined as an autonomous driving difficult section after a certain number of reports are accumulated. Therefore, it is possible to set the autonomous driving difficult section in consideration of the level of difficulty while securing the reliability of the information.

The embodiments disclosed may be carried out in modes to which various arrangements and modifications are applied based on the knowledge of those skilled in the art. For example, the ECU may be constituted of a plurality of electronic control units. The server 3 may be constituted of a plurality of servers.

What is claimed is:

1. An information processing apparatus capable of communicating with a plurality of autonomous driving vehicles, comprising:
   a storage unit configured to store locations of the plurality of autonomous driving vehicles on a map in association with difficulty state information about a level of difficulty in autonomous driving; and
   a control unit configured to
   acquire the locations of the plurality of autonomous driving vehicles on the map and the difficulty state information from the plurality of autonomous driving vehicles through communication,
   totalize a number of reports on the difficulty state information for each of levels of difficulty in each of traveling sections based on the locations and the difficulty state information stored in the storage unit,
   determine whether the totalized number of the reports is equal to or more than a threshold value for each of the levels of difficulty and determine a traveling section where at least one of the numbers of the reports is equal to or more than the threshold value as an autonomous driving difficult section, and
   distribute to the plurality of autonomous driving vehicles a location of the determined autonomous driving difficult section on the map, wherein the control unit is configured to determine the autonomous driving difficult section with a smaller threshold value as the level of difficulty is higher, and wherein actuators of the plurality of autonomous driving vehicles control steering, acceleration, or deceleration of the plurality of autonomous driving vehicles based on the location of the autonomous driving difficult section on the map received from the control unit.

2. The information processing apparatus according to claim 1, wherein the control unit is configured to distribute to the autonomous driving vehicles the level of difficulty of the difficulty state information of which the number of reports is equal to or more than the threshold value.

3. The information processing apparatus according to claim 1, wherein the difficulty in the autonomous driving includes at least one of an autonomous steering of the vehicle being unsteady, the vehicle being unable to travel at a center of a lane, speed of the vehicle having extreme fluctuation, the speed of the vehicle being unstable, the speed exceeding a limit speed of autonomous driving control in curves, intervention operation being frequently performed by a driver of the vehicle, and an emergency shutdown system being actuated.

4. The information processing apparatus according to claim 1, wherein the level of difficulty in autonomous driving is a degree of difficulty in the autonomous driving, the level being defined in stages in accordance with circumstances of the autonomous driving.

5. An information processing apparatus capable of communicating with a plurality of autonomous driving vehicles, comprising:

a storage unit configured to store locations of the plurality of autonomous driving vehicles on a map in association with difficulty state information about a level of difficulty in autonomous driving; and a control unit configured to acquire the locations of the plurality of autonomous driving vehicles on the map and the difficulty state information from the plurality of autonomous driving vehicles through communication, totalize a number of reports on the difficulty state information for each of levels of difficulty in each of traveling sections based on the locations and the difficulty state information stored in the storage unit, weight the totalized number of the reports with a weight corresponding to each of the levels of difficulty, determine whether the weighted number of the reports is equal to or more than a threshold value for each of the levels of difficulty, and determine a traveling section where at least one of the weighted numbers of the reports is equal to or more than the threshold value as an autonomous driving difficult section, and distribute to the plurality of autonomous driving vehicles a location of the determined autonomous driving difficult section on the map, wherein the control unit is configured to determine the autonomous driving difficult section with a larger weight as the level of difficulty is higher, and wherein actuators of the plurality of autonomous driving vehicles control steering, acceleration, or deceleration of the plurality of autonomous driving vehicles based on the location of the autonomous driving difficult section on the map received from the control unit.

6. The information processing apparatus according to claim 5, wherein the control unit is configured to distribute to the autonomous driving vehicles the level of difficulty of the difficulty state information of which the weighted number of the reports is equal to or more than the threshold value.

7. The information processing apparatus according to claim 5, wherein the difficulty in the autonomous driving includes at least one of autonomous steering of the vehicle being unsteady, the vehicle being unable to travel at a center of a lane, speed of the vehicle having extreme fluctuation, the speed of the vehicle being unstable, the speed exceeding a limit speed of autonomous driving control in curves, intervention operation being frequently performed by a driver of the vehicle, and an emergency shutdown system being actuated.

8. The information processing apparatus according to claim 7, wherein the level of difficulty in autonomous driving is a degree of difficulty in the autonomous driving, the level being defined in stages in accordance with circumstances of the autonomous driving.

9. An information processing apparatus capable of communicating with a plurality of autonomous driving vehicles, comprising:

a storage unit configured to store locations of the plurality of autonomous driving vehicles on a map in association with difficulty state information about a level of difficulty in autonomous driving; and a control unit configured to acquire the locations of the plurality of autonomous driving vehicles on the map and the difficulty state information from the plurality of autonomous driving vehicles through communication, totalize a number of reports on the difficulty state information for each of levels of difficulty in each of traveling sections based on the locations and the difficulty state information stored in the storage unit, calculate a score of each of the traveling sections by weighting and summing the totalized number of the reports for each of the levels of difficulty with a weight corresponding to each of the levels of difficulty and determine a traveling section where the score is equal to or more than a threshold value as an autonomous driving difficult section, and distribute to the plurality of autonomous driving vehicles a location of the determined autonomous driving difficult section on the map, wherein the control unit is configured to determine the autonomous driving difficult section with a larger weight as the level of difficulty is higher, and wherein actuators of the plurality of autonomous driving vehicles control steering, acceleration, or deceleration of the plurality of autonomous driving vehicles based on the location of the autonomous driving difficult section on the map received from the control unit.

10. The information processing apparatus according to claim 9, wherein the difficulty in the autonomous driving includes at least one of autonomous steering of the vehicle being unsteady, the vehicle being unable to travel at a center of a lane, speed of the vehicle having extreme fluctuation, the speed of the vehicle being unstable, the speed exceeding a limit speed of autonomous driving control in curves, intervention operation being frequently performed by a driver of the vehicle, and an emergency shutdown system being actuated.

11. The information processing apparatus according to claim 9, wherein
the level of difficulty in autonomous driving is a degree of the difficulty in the autonomous driving, the level being defined in stages in accordance with circumstances of the autonomous driving.

* * * * *